US012811761B2

(12) United States Patent
Du et al.

(10) Patent No.: US 12,811,761 B2
(45) Date of Patent: Nov. 24, 2026

(54) BEAM INFORMATION TRIGGERING FOR CELL ACTIVATION

(71) Applicant: Nokia Technologies Oy, Espoo (FI)

(72) Inventors: Lei Du, Beijing (CN); Lars Dalsgaard, Oulu (FI); Karri Markus Ranta-Aho, Espoo (FI); Jani-Pekka Kainulainen, Cambridge (GB)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 19/179,354

(22) Filed: Apr. 15, 2025

(65) Prior Publication Data

US 2026/0155946 A1 Jun. 4, 2026

Related U.S. Application Data

(63) Continuation of application No. PCT/CN2022/130444, filed on Nov. 7, 2022.

(51) Int. Cl.
*H04L 5/00* (2006.01)
*H04B 7/06* (2006.01)
(Continued)

(52) U.S. Cl.
CPC ......... *H04L 5/0098* (2013.01); *H04B 7/0632* (2013.01); *H04B 7/06952* (2023.05); *H04B 17/328* (2023.05); *H04L 1/1812* (2013.01); *H04L 5/001* (2013.01); *H04L 5/0023* (2013.01); *H04L 5/0048* (2013.01); *H04L 5/005* (2013.01); *H04W 24/08* (2013.01); *H04W 24/10* (2013.01); *H04W 72/0446* (2013.01);
(Continued)

(58) Field of Classification Search
CPC .... H04L 5/0098; H04W 24/10; H04W 76/15; H04B 7/06
See application file for complete search history.

(56) References Cited

U.S. PATENT DOCUMENTS

2019/0150161 A1* 5/2019 Cheng .................. H04W 76/27 370/330
2022/0086702 A1* 3/2022 Wang ..................... H04B 7/088
(Continued)

FOREIGN PATENT DOCUMENTS

CN 112019313 A 12/2020
EP 3952608 A1 2/2022
(Continued)

OTHER PUBLICATIONS

"Email discussion summary for [95e-06-RAN4-R18-RRM]", 3GPP TSG RAN Meeting #95-e, RP-220866, Agenda: 9.1.4.3, Apple, Mar. 17-23, 2022, 15 pages.
(Continued)

*Primary Examiner* — Asad M Nawaz
*Assistant Examiner* — Sanaa Al Samahi
(74) *Attorney, Agent, or Firm* — Brake Hughes Bellermann LLP

(57) ABSTRACT

A first device obtains, from a second device, via a first cell, a configuration for adding a second cell for the first device. The first device determines, based on at least one condition associated with the added second cell being met, that beam information of the second cell is to be transmitted. The first device transmits the beam information to the second device.

17 Claims, 9 Drawing Sheets

(51) Int. Cl.

| | |
|---|---|
| ***H04B 17/318*** | (2015.01) |
| ***H04L 1/1812*** | (2023.01) |
| ***H04W 24/08*** | (2009.01) |
| ***H04W 24/10*** | (2009.01) |
| ***H04W 72/044*** | (2023.01) |
| ***H04W 72/0446*** | (2023.01) |
| ***H04W 72/23*** | (2023.01) |
| ***H04W 76/15*** | (2018.01) |
| ***H04W 76/34*** | (2018.01) |

(52) U.S. Cl.

CPC ......... *H04W 72/046* (2013.01); *H04W 72/23* (2023.01); *H04W 76/15* (2018.02); *H04W 76/34* (2018.02)

(56) References Cited

U.S. PATENT DOCUMENTS

| | | | | |
|---|---|---|---|---|
| 2022/0110109 | A1* | 4/2022 | Tsai | H04L 5/0098 |
| 2022/0174507 | A1* | 6/2022 | Takada | H04W 24/08 |
| 2022/0264561 | A1* | 8/2022 | Fan | H04W 72/21 |
| 2022/0303811 | A1* | 9/2022 | Kakishima | H04W 24/10 |
| 2025/0056543 | A1* | 2/2025 | Kang | H04L 5/0092 |
| 2026/0046738 | A1* | 2/2026 | Xu | H04W 36/362 |

FOREIGN PATENT DOCUMENTS

| | | | | |
|---|---|---|---|---|
| EP | 3968729 | A1 * | 3/2022 | H04L 5/0057 |
| JP | 2019-057911 | A | 4/2019 | |
| WO | 2020/202397 | A1 | 10/2020 | |
| WO | WO-2021034313 | A1 * | 2/2021 | H04W 16/28 |
| WO | WO-2022015052 | A1 * | 1/2022 | H04L 5/0094 |
| WO | 2022/226741 | A1 | 11/2022 | |
| WO | 2022/266970 | A1 | 12/2022 | |
| WO | WO-2023065119 | A1 * | 4/2023 | H04W 24/02 |

OTHER PUBLICATIONS

"3rd Generation Partnership Project; Technical Specification Group Radio Access Network; NR; Requirements for support of radio resource management (Release 17)", 3GPP TS 38.133, V17.7.0, Sep. 2022, 5191 pages.

"WF on R18 eFeRRM—FR2 SCell activation enhancement", 3GPP TSG-RAN WG4 Meeting # 104-bis-e, R4-2217249. Agenda: 6.9, Apple, Oct. 10-19, 2022, 7 pages.

"Discussion on RRM requirements for FR2 unknown Scell activation delay reduction", 3GPP TSG-RAN WG4 Meeting # 104bis-e, R4-2216744, Agenda: 6.9.2, Qualcomm Incorporated, Oct. 10-19, 2022, 4 pages.

"Discussion on L3 part enhancement for FR2 SCell activation", 3GPP TSG RAN WG4 Meeting #104-bis-e, R4-2216828, Agenda: 6.9.2.1, Ericsson, Oct. 10-19, 2022, pp. 1-5.

"L3 part enhancement for FR2 SCell activation", 3GPP TSG-RAN WG4 Meeting #104bis-e, R4-2215785, Agenda: 6.9.2.1, Nokia, Oct. 10-19, 2022, 4 pages.

"3rd Generation Partnership Project, Technical Specification Group Radio Access Network; Evolved Universal Terrestrial Radio Access (E-UTRA); Requirements for support of radio resource management (Release 17)", 3GPP TS 36.133, V17.7.0, Sep. 2022, 4066 pages.

"3rd Generation Partnership Project; Technical Specification Group Radio Access Network; NR; Physical layer procedures for control (Release 17)", 3GPP TS 38.213, V17.3.0, Sep. 2022, pp. 1-260.

"IEEE 802.11", Wikipedia, Retrieved on May 23, 2025, Webpage available at : https://en.wikipedia.org/wiki/IEEE_802.11.

Invitation to Pay Additional Fees received for corresponding Patent Cooperation Treaty Application No. PCT/CN2022/130444, dated Mar. 30, 2023, 11 pages.

International Search Report and Written Opinion received for corresponding Patent Cooperation Treaty Application No. PCT/CN2022/130444, dated May 24, 2023, 19 pages.

"L3 part enhancement for FR2 SCell activation", 3GPP TSG-RAN WG4 Meeting #105, R4-2218678, Agenda: 8.9.2.1, Nokia, Nov. 14-18, 2022, 5 pages.

"L1 part enhancement for FR2 SCell activation", 3GPP TSG-RAN WG4 Meeting #105, R4-2218679, Agenda: 8.9.2.2, Nokia, Nov. 14-18, 2022, 3 pages.

"Other enhancements for FR2 SCell activation", 3GPP TSG-RAN WG4 Meeting #105, R4-2218680, Agenda: 8.9.2.3, Nokia, Nov. 14-18, 2022, 3 pages.

"Feasible solutions for FR2 SCell/SCG setup/resume delay enhancements", 3GPP TSG-RAN WG4 Meeting #105, R4-2219442, Agenda: 8.21.2, Nokia, Nov. 14-18, 2022, 10 pages.

Office action received for corresponding Japanese Patent Application No. 2025-525670, dated May 19, 2026, 4 pages of office action and 4 pages of summary available.

Office Action for Japanese Patent Application No. 2025-525670, mailed on Sep. 8, 2026, 3 pages.

* cited by examiner

BEAM INFORMATION TRIGGERING FOR CELL ACTIVATION

RELATED APPLICATION

The present application is a 37 C.F.R. § 1.53(b) continuation of co-pending a Patent Cooperation Treaty Application No. PCT/CN2022/130444 filed on Nov. 7, 2022, which is hereby incorporated in its entirety.

FIELD

Various example embodiments of the present disclosure generally relate to the field of telecommunication and in particular, to methods, devices, apparatuses and computer program product for beam information triggering for cell activation.

BACKGROUND

With the rapid development of the communication technology, it requires larger communication capacity. In some scenarios, a terminal device may be configured with a plurality of serving cells, including primary cells (PCells), Primary Secondary SCell (PSCell) and secondary cells (SCells), for example. As data rate requirements of the terminal device may vary over time, these cells may need to be activated or deactivated to meet the data rate requirements. To activate a cell, beam information associated with the cell needs to be reported by the terminal device to a network in time.

SUMMARY

In a first aspect of the present disclosure, there is provided a first device. The first device comprises at least one processor; and at least one memory storing instructions that, when executed by the at least one processor, cause the first device at least to perform: obtaining, from a second device, via a first cell, a configuration for adding a second cell for the first device; determining, based on at least one condition associated with the added second cell being met, that beam information of the second cell is to be transmitted; and transmitting the beam information to the second device.

In a second aspect of the present disclosure, there is provided a second device. The second device comprises at least one processor; and at least one memory storing instructions that, when executed by the at least one processor, cause the second device at least to perform: transmitting, to a first device, via a first cell, a configuration of adding a second cell for the first device; determining, based on at least one condition associated with the added second cell being met, that a first resource is to be allocated for a transmission of beam information of the second cell; allocating, on the first cell, the first resource for the transmission of the beam information; transmitting, to the first device, an indication of the first resource; and receiving, from the first device, the beam information on the first resource.

In a third aspect of the present disclosure, there is provided a first device. The first device comprises at least one processor; and at least one memory storing instructions that, when executed by the at least one processor, cause the first device at least to perform: receiving, from a second device, via a first cell, a transmission configuration indication activation command for a second cell, the transmission configuration indication activation command indicating an identification of a first channel-state information reference signal; receiving, from the second cell, the first channel-state information reference signal based on the identification; receiving, from the second cell, a periodic second channel-state information reference signal associated with the first channel-state information reference signal; and performing a channel state measurement based on the second channel-state information reference signal.

In a fourth aspect of the present disclosure, there is provided a method. The method comprises: at a first device, obtaining, from a second device, via a first cell, a configuration for adding a second cell for the first device; determining, based on at least one condition associated with the added second cell being met, that beam information of the second cell is to be transmitted; and transmitting the beam information to the second device.

In a fifth aspect of the present disclosure, there is provided a method. The method comprises: at a second device, transmitting, to a first device, via a first cell, a configuration of adding a second cell for the first device; determining, based on at least one condition associated with the added second cell being met, that a first resource is to be allocated for a transmission of beam information of the second cell; allocating, on the first cell, the first resource for the transmission of the beam information; transmitting, to the first device, an indication of the first resource; and receiving, from the first device, the beam information on the first resource.

In a sixth aspect of the present disclosure, there is provided a method. The method comprises: at a first device, receiving, from a second device, via a first cell, a transmission configuration indication activation command for a second cell, the transmission configuration indication activation command indicating an identification of a first channel-state information reference signal; receiving, from the second cell, the first channel-state information reference signal based on the identification; receiving, from the second cell, a periodic second channel-state information reference signal associated with the first channel-state information reference signal; and performing a channel state measurement based on the second channel-state information reference signal.

In a seventh aspect of the present disclosure, there is provided an apparatus. The apparatus comprises means for obtaining, from a second device, via a first cell, a configuration for adding a second cell for the apparatus; means for determining, based on at least one condition associated with the added second cell being met, that beam information of the second cell is to be transmitted; and means for transmitting the beam information to the second device.

In an eighth aspect of the present disclosure, there is provided an apparatus. The apparatus comprises means for transmitting, to a first device, via a first cell, a configuration of adding a second cell for the first device; means for determining, based on at least one condition associated with the added second cell being met, that a first resource is to be allocated for a transmission of beam information of the second cell; means for allocating, on the first cell, the first resource for the transmission of the beam information; means for transmitting, to the first device, an indication of the first resource; and means for receiving, from the first device, the beam information on the first resource.

In a ninth aspect of the present disclosure, there is provided an apparatus. The apparatus comprises means for receiving, from a second device, via a first cell, a transmission configuration indication activation command for a second cell, the transmission configuration indication activation command indicating an identification of a first channel-state information reference signal; means for receiving, from the second cell, the first channel-state information reference signal based on the identification; means for receiving, from the second cell, a periodic second channel-state information reference signal associated with the first channel-state information reference signal; and means for performing a channel state measurement based on the second channel-state information reference signal.

In a tenth aspect of the present disclosure, there is provided a computer program product. The computer program product comprises a computer readable medium. The computer readable medium comprises instructions stored thereon for causing an apparatus to perform at least the method according to the fourth aspect, the fifth aspect or the sixth aspect.

In an eleventh aspect of the present disclosure, there is provided a computer program comprising instructions which, when the program is executed by an apparatus, causes the apparatus to carry out at least the method according to the fourth aspect, the fifth aspect or the sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
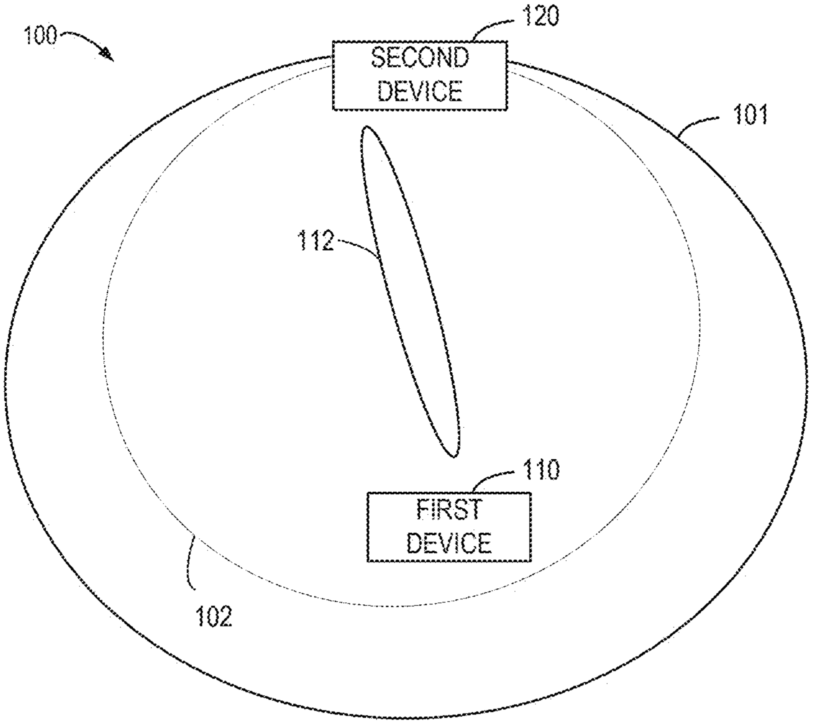
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As mentioned above, during cell activation, beam information associated with a cell need to be reported by the terminal device to the network. However, a long activation delay may be induced due to beam sweeping including cell detection, layer one (L1) reference signal received power (RSRP) measurement, channel-state information (CSI) measurement and so on.

In some mechanisms, the terminal device may obtain the beam information from a layer three (L3) measurement and transmit the beam information once a SCell activation command for the SCell is received. According to such mechanisms, the terminal device needs to use a UL resource provided by the network device to transmit the beam information. However, the network may not be aware of the latest measurement status at the terminal device, thus does not know if it shall schedule resources for the beam information reporting from the terminal device, or it just waits a bit longer for the legacy L1-RSRP reporting.

In some mechanisms, the network may always schedule the UL resource for beam reporting, and it is up to the terminal device to determine the measurement status and send beam reporting if necessary. However, such mechanisms will bring waste of the UL resource if the terminal device is not ready to send any beam reporting.

In some mechanisms, upon the cell activation command, the cell status at the terminal device may be aligned to that at the network device to avoid misunderstanding on the cell activation process. Such mechanisms may allow the terminal device to send the beam reporting if the terminal device has acquired the L3 measurement at the time of secondary (SCell) cell activation, and may hence turn the unknown SCell into known status. However, such mechanisms do not consider how to transmit the beam reporting on a primary cell (PCell).

According to some example embodiments of the present disclosure, there is provided a scheme for beam information triggering for cell activation. In this scheme, a first device (such as a terminal device or a control apparatus within the terminal device) receives, from a second device (such as a network device or a control apparatus within the network device), via a first cell (such as a PCell), a configuration for adding a second cell (such as a SCell) for the first device. The second device and the first device make a determination regarding the beam information triggering based on at least one condition associated with the added second cell. For example, the second device determines to allocate a resource for the beam information transmission if the at least one condition is met. The first device determines to transmit the beam information based on the at least one condition as well and then transmits the beam information to the second device. In some example embodiments, the first device may transmit the beam information by using the resource allocated by the second device for the beam information transmission.

It is noted that if the at least one condition is not met, then the first device may determine not to trigger the beam report transmission before the legacy L1-RSRP reporting, and the second device may determine not to allocate the resource for the beam information transmission but to wait for the legacy L1-RSRP reporting.

In this way, the second device may be aware of the beam information triggering, and then can allocate a resource for beam information transmission. Thus, the beam information can be transmitted when needed. The cell activation delay thus can be reduced. In addition, the second device will not allocate any resource if the beam information is not to be transmitted, thus the resource will not be wasted. Such solution will reduce the cell activation delay without wasting the resource of the first cell.

FIG. 1 illustrates an example communication environment 100 in which example embodiments of the present disclosure can be implemented. In the communication environment 100, a plurality of communication devices, including a first device 110 and a second device 120, can communicate with each other.

In the following, for the purpose of illustration, some example embodiments are described with the first device 110 operating as a terminal device and the second device 120 operating as a network device. However, in some example embodiments, operations described in connection with a terminal device may be implemented at a network device or other device, and operations described in connection with a network device may be implemented at a terminal device or other device.

In some example embodiments, if the first device 110 is a terminal device (or a control apparatus inside the terminal device) and the second device 120 is a network device (or a control apparatus inside the network device), a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the environment 100, a first device 110 may get access to a communication network via a plurality of cells, including a first cell 101 and a second cell 102, for example. These cells may be provided by a second device 120 or any other suitable devices. For example, the cell 101 and the cell 102 may be provided by the second device 120. In some example embodiments, either or both of these cells may also be provided by a further device (not shown).

In some example embodiments, the first cell 101 may be a primary cell (PCell), and the second cell 102 may be a secondary primary cell (PSCell) or a secondary cell (SCell). Although two cells 101 and 102 are shown in FIG. 1, less or more cells may be provided for the first device 110.

In some example embodiments, the communication environment 100 may comprise other devices (not shown), which may employ the same or a different radio access technology with the second device 120. Other devices may also provide the first device 110 with cells, such as a primary secondary cell (PSCell) and other SCells.

In some example embodiments, the second device 120 may be configured to implement a beamforming technique and transmit signals to the first device 110 via a plurality of beams. The first device 110 may be configured to receive the signals transmitted by the second device 120 via the plurality of beams. There may be different beams configured for the first cell 101 and the second cell 102. As shown in FIG. 1, DL beam 112 may be configured for the second cell 102. It is to be understood that the second cell 102 may have more beams associated therewith. Although not shown, the first cell 101 may also have beams associated therewith.

In some example embodiments, the first cell 101 is in an activated status. For example, the first device 110 and the second device 120 may communicate using resources on the first cell 101.

It is to be understood that the number of devices, cells and beams is only for the purpose of illustration without suggesting any limitations. The communication environment 100 may include any suitable number of devices, cells and beams adapted for implementing embodiments of the present disclosure.

In some example embodiments, the second cell 102 may be in different status. For example, in the scenarios where the second cell 102 is a SCell in frequency range 2 (FR2) bands, the second cell 102 may be in a "known" status if some conditions are fulfilled.

The conditions may comprise a condition that during the period equal to 4 s for the first device 110 supporting power class 1/5 and 3 s for first device 110 supporting power class 2/3/4 before first device 110 receives the last activation command for physical downlink control channel (PDCCH) transmission configuration indication (TCI), physical downlink shared channel (PDSCH TCI) (when applicable) and semi-persistent channel-state information (CSI)-reference signal (RS) (CSI)-RS for channel quality indicator (CQI) reporting (when applicable): (1) the first device 110 has sent a valid layer three (L3)-reference signal received power (RSRP) measurement report with a Synchronization Signal and Physical Broadcast Channel (PBCH) Block (SSB) index; and (2) the SCell activation command is received after L3-RSRP reporting and no later than the time when the first device receives medium access control (MAC)-control element (CE) command for TCI activation.

In addition, the conditions may comprise a condition that during the period from L3-RSRP reporting to the valid CQI reporting, the reported SSBs with indexes remain detectable according to the cell identification conditions, and the TCI state is selected based on one of the latest reported SSB indexes.

The SCell may be considered as "unknown" if the first device 110 has not sent any L3 measurement reporting or the last report has expired, i.e., received longer than 3 or 4 seconds ago (see above paragraph). The SCell may be considered as "unknown" if the first device 110 is measuring it for a first time.

According to some example embodiments, the first device 110 and the second device 120 determines a decision regarding the beam information triggering for the second cell 102 based on historical status of the second cell 102 (i.e., based on SCell status history). For example, the second device 120 allocates a first resource on the first cell 101 for the beam information triggering. The first device 110 transmits the beam information to the second device 120 on the first resource or on a further available resource on the first cell 101. The embodiments provide for a common understanding between the first device and the second device regarding whether beam information is to be transmitted. This is beneficial as then e.g., the second device knows when to allocate the resource to the first device for beam information transmission or the network knows when to expect the first device to transmit beam information to the second device on the further available resource. The embodiments may advantageously decrease the time required for the second device of the first cell to receive the beam information of the second cell.

Figure 2:
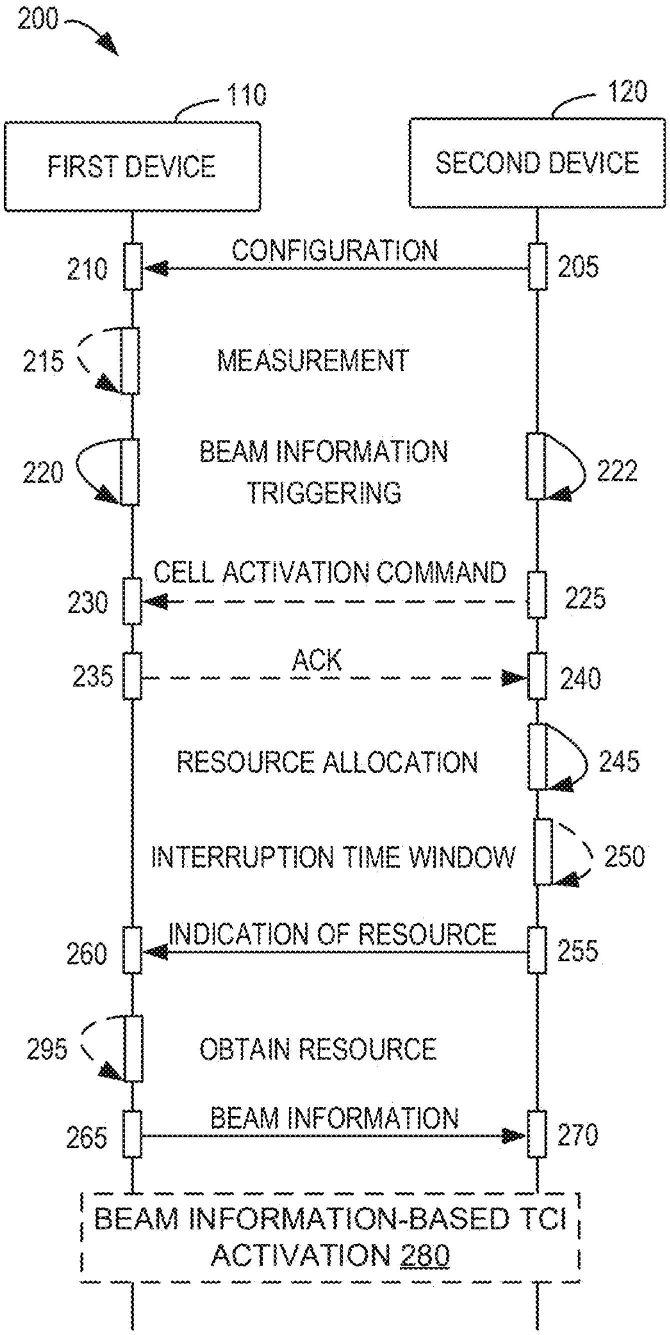
FIG. 2 illustrates a signaling diagram for transmitting beam information according to some example embodiments of the present disclosure.

FIG. 2 shows a signaling diagram 200 for beam information triggering according to some example embodiments of the present disclosure. For the purpose of discussion, the signaling diagram 200 will be described with reference to FIG. 1.

As shown in FIG. 2, the second device 120 transmits (205), to the first device 110 via the first cell 101, a configuration of adding a second cell 102 for the first device 110. The first device 110 and the first cell 101 are in a connected mode. The second cell 102 may be a SCell, such as a first SCell (i.e., a first SCell configured for the first device) or primary secondary cell (PSCell) on a FR2 band. The first device 110 obtains (210) the configuration and may be aware that the second cell 102 is configured or added for the first device 110. In some example embodiments, an activated state of the second cell 102 (also referred to as SCellState) has not been configured. That is, the second cell 102 has not been activated since the configuration and is in a deactivated state after the configuration.

In some example embodiments, the first device 110 may have not sent any measurement report for the second cell 102. The first device 110 may perform (215) a measurement for the second cell 102. For example, the first device 110 may perform (215) a L3 measurement for the second cell 102 in a deactivated state. An example process of cell measurement will be discussed below with reference to FIG. 3.

Figure 3:
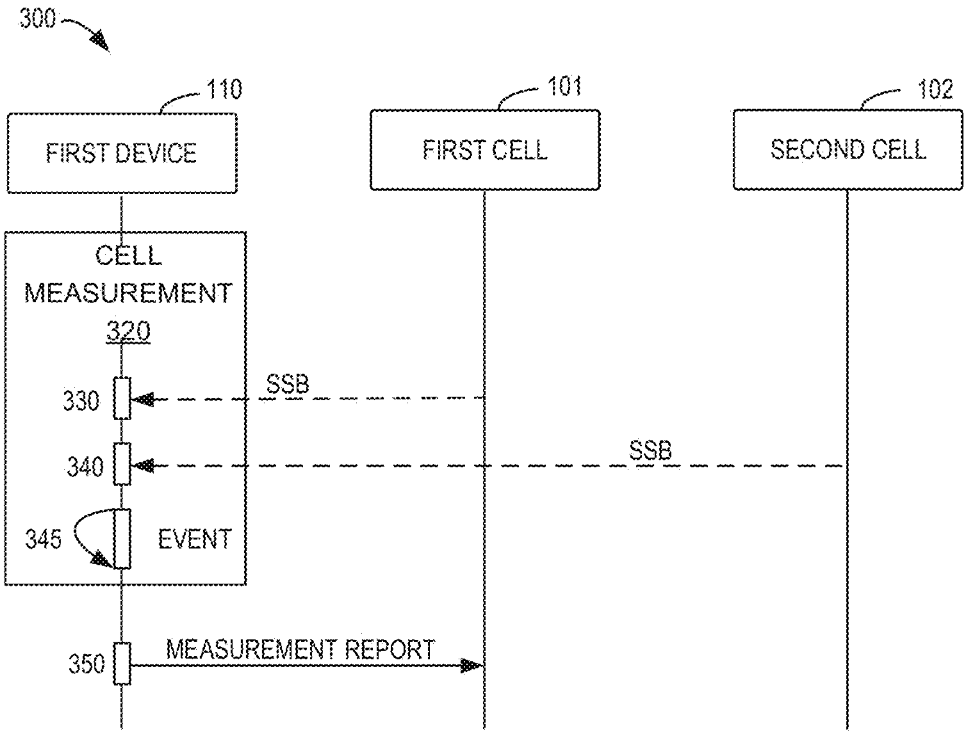
FIG. 3 illustrates a signaling diagram for cell measurement according to some example embodiments of the present disclosure.

FIG. 3 shows a signaling diagram 300 for cell measurement according to some example embodiments of the present disclosure. For the purpose of discussion, the signaling diagram 300 will be described from the perspective of the first device 110 with reference to FIG. 1.

As shown in FIG. 3, the first device 110 may receive (330 or 340) Synchronization Signal and Physical Broadcast Channel (PBCH) Block (SSB) and/or Channel State Information-Reference Signal (CSI-RS) information of the first cell 101 via the first cell 101 from the second device 120. For example, one or more SSB information may be received (330 or 340) by the first device 110. The first device 110 performs (320) cell measurement based on the received SSB information. For example, the first device 110 may perform a L3 measurement for the second cell 102. In some example embodiments, the first device 110 performs (320) the cell measurement for the second cell 102 based on a measurement cycle configured for the second cell 102 in the deactivated state.

In some example embodiments, the first device 110 may determine (345) whether an event is triggered. An example event may comprise that the second cell 102 is a first SCell or PSCell on one band. In some example embodiments, if the latest activated beam or reported SSB is not detectable for the second cell 102, or the latest activated beam or reported SSB is below a threshold or is not the best one, the first device 110 may determine (345) that an event is triggered. If the first device 110 determines (345) that the event is triggered, the first device 110 may transmit (350) a measurement report via the first cell 101 to the second device 120.

In some example embodiments, the first device 110 may delay the transmission (350) of a measurement report via the first cell 101 to the second device 120 until receiving the SCell activation command. By transmitting (350) the measurement report after the cell activation command, the first device can achieve power saving by sending the measurement report only when necessary. Alternatively, or in addition, in some example embodiments, the first device 110 may transmit (350) the measurement report without waiting for the cell activation command, which may be beneficial as this embodiment may keep the second cell always as known.

Still referring to FIG. 2, the first device 110 determines (220) whether beam information of the second cell 102 is to be transmitted. Likewise, the second device 120 determines (222) whether a first resource is to be allocated for a transmission of the beam information. The determination (220 or 222) is made based on at least one condition associated with the second cell 102.

In some example embodiments, the at least one condition comprises a first condition that the second cell 102 has been activated and then deactivated since configuration. For example, the first device 110 and the second device 120 may determine that the first condition is met based on historical configuration or historical activation status information of the second cell 102. If the first condition is met, the first device 110 may determine (220) to transmit the beam information. Optionally, the second device 120 may determine (222) to allocate the first resource for the beam information transmission.

In some example embodiments, the at least one condition comprises a second condition that the measurement information of the second cell 102 has been transmitted by the first device 110 after the second cell 102 has been added for the first device 110. In other words, the second condition is that the measurement information of the second cell 102 has been transmitted by the first device and received by the second device 120 after the second cell 102 has been added for the first device 110. For example, the measurement information may be transmitted or received following the signaling diagram 300 in FIG. 3. In some example embodiments, the first device 110 and the second device 120 may determine that the second condition is met based on historical configuration or historical activation status information of the second cell 102. If the second condition is met, the first device 110 may determine (220) to transmit the beam information. Optionally, the second device 120 may determine (222) to allocate the first resource for the beam information transmission.

Alternatively, or in addition, in some example embodiments, the at least one condition comprises a third condition that a time duration between the addition of the second cell 102 for the first device 110 and a reception of an activation command for the second cell 102 is longer than a first time period. The first time period may be predefined. For example, if the second cell 102 has not been activated and the first device 110 has not sent any measurement information for the second cell 102 since adding the second cell 102, and if the time duration between the addition of the second cell 102 for the first device 110 and the reception of the activation command for the second cell 102 is longer than the first time period, the third condition is met. In other words, if the second cell 102 is newly configured and has not been measured, and if the above time duration is longer than the first time period, the third condition is met.

In some example embodiments, the first time period may be equal to or longer than a cell identification time for identifying the deactivated second cell 102 by the first device 110. For example, the first time period may be $T_{identify\_intra\_without\_index}$, which may be determined by using the following equation (1).

$$T_{identify\_intra\_without\_index} = (T_{PSS/SSS\_sync\_intra} + T_{SSB\_measurement\_period\_intra})\ \text{ms} \tag{1}$$

where $T_{identify\_intra\_without\_index}$ represents the first time period, $T_{PSS/SSS\_sync\_intra}$ represents a time period for Primary synchronization signal (PSS) or secondary synchronization signal (SSS) synchronization, and $T_{SSB\_measurement\_period\_intra}$ represents a time period for SSB measurement. In these time periods, the value for a deactivated SCell may be adopted.

If the third condition is met, the first device 110 may determine (220) to transmit the beam information. Optionally, the second device 120 may determine (222) to allocate the first resource for the beam information transmission.

In some example embodiments, the at least one condition comprises a fourth condition that the first device 110 has been configured with inter-frequency SSB-based or CSI-RS based measurement on the second cell 102 before the second cell 102 is added for the first device 110. If the fourth condition is met, the first device 110 has measured the second cell 120 at the time of adding the second cell 120. The first device 110 may determine (220) to transmit the beam information. Optionally, the second device 120 may determine (222) to allocate the first resource for the beam information transmission. As used herein, if any of the above conditions is met, the second cell 102 may be referred to as "semi-known" or "semi-unknown". If the first device 110 and second device 120 determine that the second cell 102 is semi-known or semi-unknown, the first device 110 and the second device 120 may trigger the beam information reporting from the network. Example conditions regarding the beam information triggering have been described, it is to be understood that the example conditions are only for the purpose of illustration, without suggesting any limitations. Any suitable condition may be applied for the determination.

If the second device 120 determines (222) to allocate a resource for the beam information, the second device 120 allocates (245) the resource on the first cell 101 for the beam information transmission. As used herein, the resource allocated (245) for the beam information transmission may be referred to as the first resource. The first resource may comprise a UL resource on the first cell 101. The second device 120 transmits (255) an indication of the first resource to the first device 110. For example, the indication may comprise downlink control information (DCI). The first device 110 receives (260) the indication of the first resource. The first device 110 transmits (265) the beam information by using the first resource. The second device 120 receives (270) the beam information.

In some example embodiment, the second device 120 may transmit (225) a cell activation command to the first device 110 before the transmitting (255) the indication of the first resource. For example, if the second cell 102 has not been activated or no measurement information has been received by the second device 120, the second device 120 may transmit (225) the cell activation command. In the case that the second cell 102 acts as a SCell, the cell activation command may also be referred to as a SCell activation command.

In some example embodiments, if the first device 110 receives (230) the cell activation command, the first device 110 may transmit (235) an acknowledgement (ACK) of the cell activation command. The ACK may comprise a Hybrid Automatic Repeat Request (HARQ) ACK.

In some example embodiment, if the second device 120 receives (240) the ACK, the second device 120 may allocate (245) the first resource. By transmitting the indication of the first resource after the cell activation command, the second device can achieve power saving by allocating resource for transmission of the beam information only when necessary.

In the example embodiments where the second device 120 transmits (225) the cell activation command, the second device 120 may wait (250) for an interruption window before transmitting (255) the indication of the first resource. The interruption window represents a time duration during which the first device 110 may adjust its configuration or its hardware based on the cell activation command. For instance, the interruption window is equal to the interruption at SCell activation. After that, the first device 110 may be ready for the beam information transmission. Accordingly, the second device 120 may transmit (255) the indication after the interruption window. In this way, the first device 110 may receive (260) the indication of the first resource after the first device 110 is ready for the beam information transmission.

In some example embodiments, the second device 120 may transmit (255) the indication within a time duration after transmitting (225) the cell activation command. The time duration may be longer than the interruption window but shorter than a predefined time period that may be set statically or configured dynamically depending on the network deployment and/or the implementations. In this way, the second device can ensure that the first device 110 is ready for the beam information transmission and also ensure that the delay for receiving the beam information of the second cell 102 may be limited.

Alternatively, or in addition, in some example embodiments, the second device 120 may allocate (245) the first resource if the at least one condition is met without waiting for the cell activation command. The first device 110 may transmit (265) the beam information without waiting for the cell activation command, as well. For example, the first device 110 may transmit the L3 measurement without waiting for the cell activation command. In this way, the second cell 102 may be always known to the second device 120.

As mentioned above, the first device 110 transmits (265) the beam information on the first resource allocated (245) by the second device 120. In some example embodiments, the beam information may comprise a beam index of the second cell 102 and/or be carried in a measurement report of the second cell 102. For example, the first device 110 may transmit a L3 measurement report with a SSB or CSI-RS index of the second cell 102 on the first resource on the first cell 101.

In some example embodiments, the first cell 101 and the second cell 102 are collocated. Alternatively, or in addition, in some example embodiments, the first cell 101 and second cell 102 are non-collocated. If the first cell 101 and second cell 102 are non-collocated, the second device 120 may transmit at least one of the beam information or a transmission configuration indication (TCI) activation command for the second cell 102 to the second cell 102. In this way, the non-collocated second cell 102 may obtain the beam information and/or the TCI activation command in time.

In some example embodiments, a beam information-based TCI activation may be performed (280) by the first device 110 and the second device 120. Details regarding the beam information-based TCI activation will be described with respect to FIG. 4 and FIG. 5 in the following paragraphs.

By determining the triggering of beam information transmission by both the first device 110 and the second device 120, the second device 120 can dynamically allocate a UL resource for the beam information transmission when necessary. The first device 110 can use the allocated resource to transmit the beam information. In this way, the cell activation delay can be reduced.

In some example embodiments, the first device 110 may use other available resource for the beam information transmission. That is, the second device 120 may not allocate (245) the first resource for the beam information transmission. Accordingly, the second device 120 may not transmit (265) the indication of the first resource. In such cases, the first device 110 may obtain (295) a second resource on the first cell 101. The second resource may comprise an available UL resource for a transmission of a channel quality information report or a reference signal receiving power report. By way of example, the channel quality information report may comprise a channel quality indicator (CQI) report, the reference signal receiving power report may comprise a layer one (L1) RSRP report. As used herein, the resource for the transmission of channel quality information report or reference signal receiving power report may be referred to as the second resource.

In the example embodiments where the first device 110 transmits (265) on the second resource, the beam information may comprise a predetermined value indicating a beam index of the second cell 102. For example, the predetermine value may indicate a SSB index of the second cell 102. The predetermined value may be set corresponding to a beam where the first device 120 intends to report.

In some example embodiments, starting from the slot for the activation of the second cell 102 and until the first device 110 receives a TCI activation command, the first device 110 may transmit (265) a predetermined value X on a first available UL resource to report the beam information for the second cell 102. X may be zero or a lowest non-zero L1 RSRP value, or any other suitable value.

In some example embodiments, the first device 110 may set values for the CSI reports. Example fields of the CSI reports may be shown in Table 1 below.

TABLE 1

| Field | Bit width |
|---|---|
| CRI | $\lceil \log_2(K_s^{CSI-RS}) \rceil$ |
| SSBRI | $\lceil \log_2(K_s^{SSB}) \rceil$ |
| RSRP | 7 |
| Differential RSRP | 7 |

In some example embodiments, the first device 110 may set values for the CSI reports as follows: CSI reference signal (CSI-RS) resource indicator (CRI) should be absent (reporting synchronization signal (SS)-RSRP instead of CSI-RSRP, hence no CSI-RS in the CSI report) and differential RSRP should be absent (nrofReportedRS=1, i.e. reporting RSRP for one SSB only), and one RSRP value (all zeroes, all ones or any other suitable value) to mean that there is valid SSB to report.

By using the second resource for beam information transmission, the second device 120 may not need to schedule the first resource dedicated to the beam information transmission, and thus the overhead may be reduced, and the resource efficiency may be improved. In addition, the cell activation delay may be further reduced because the second device 120 need not to allocate the first resource and transmit the indication of the first resource.

Example embodiments regarding beam information transmission have been described with respect to FIGS. 2 and 3. By determining the triggering of beam information transmission by both the first device 110 and the second device 120, the first device 110 can use the allocated first resource or use the available second resource to transmit the beam information. In this way, the network may be able to send TCI activation command without waiting for a cell detection or L1 RSRP reporting, and thus the cell activation delay can be reduced.

As discussed above, after the beam information transmission, beam information-based TCI activation may be performed (280). An example process of the beam information-based TCI activation will be discussed below with reference to FIG. 4.

Figure 4:
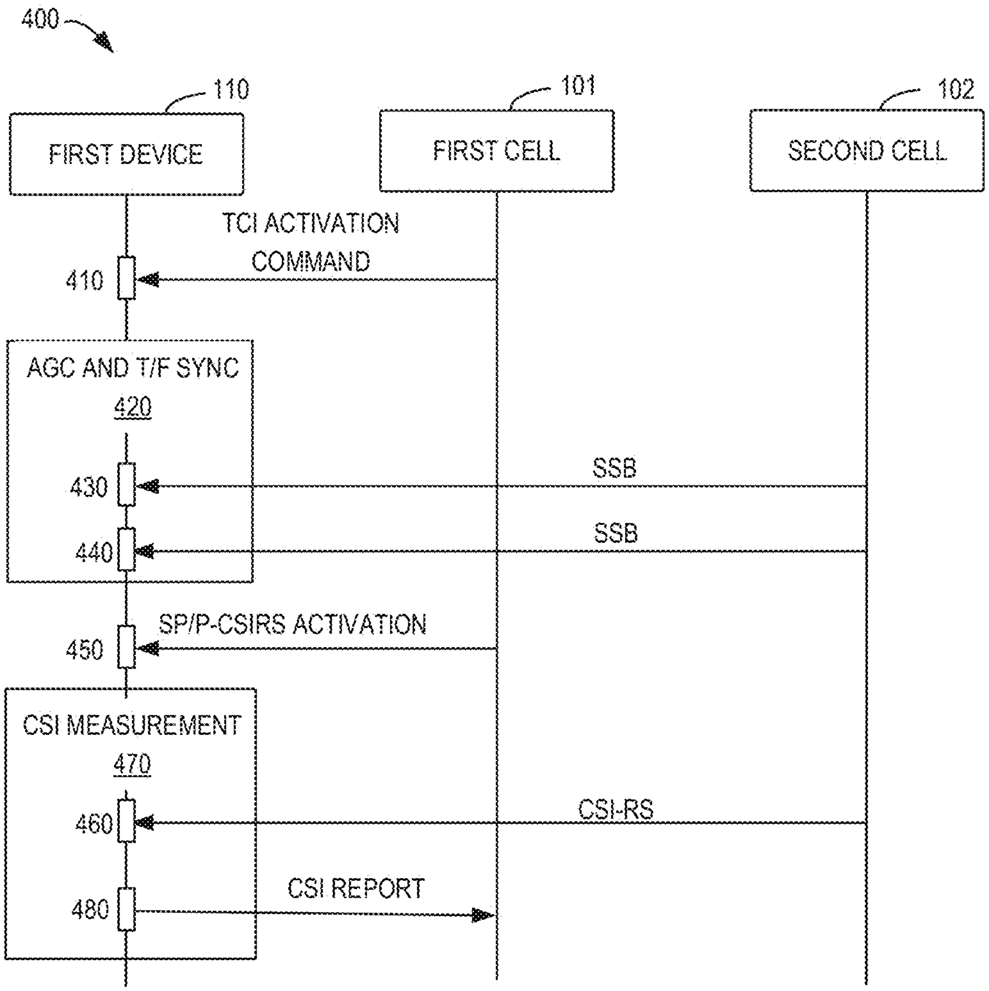
FIG. 4 illustrates a signaling diagram for beam information-based TCI activation according to some example embodiments of the present disclosure.

FIG. 4 illustrates a signaling diagram 400 for beam information-based TCI activation between the first device 110 and the first and second cells 101 and 102 according to some example embodiments of the present disclosure. For the purpose of discussion, the signaling diagram 400 will be described from the perspective of the first device 110 with reference to FIG. 1.

As shown in FIG. 4, the first device 110 may receive (410) a TCI activation command for the second cell 102 via the first cell 101 from the second device 120. For example, based on the beam information received from the first device 110, a DL resource on the first cell 101 may be determined by the second device 120 to activate the second cell 102. The TCI activation command may be transmitted on the DL resource to the first device 110. The first device 110 may receive (410) the TCI activation command for the second cell 102 on the DL resource of the first cell 101 from the second device 120.

In some example embodiments, the first device 110 may perform (420) an automatic gain control (AGC) and time/frequency (T/F) synchronization. For example, the first device 110 may receive (430) a SSB signal via the second cell 102 from a network node of the second cell 102. For example, the network node of the second cell 102 may comprise the second device 120 or a further network device. In some example embodiments, more than one SSB signal may be transmitted to the first device 110 via the second cell 102. For example, the first device 110 may receive (430 or 440) the SSB signal(s). The first device 110 may perform (420) the AGC and T/F synchronization based on the SSB signal(s).

In some example embodiments, the first device 110 may receive (450) a CSI-RS activation command via the first cell 101. For example, the CSI-RS activation command may comprise a semi-persistent (SP)-CSIRS or periodic (P)-CSIRS.

In some example embodiments, the first device 110 may perform (470) a channel measurement such as a CSI measurement for the second cell 102. For example, the CSI-RS resource from the second cell 102 may be determined based on the reported beam information of the second cell 102. In some example embodiments, the first device 110 may receive (460) CSI-RS(s) via the second cell 102. The first device 110 may perform (470) the CSI measurement based on the received (460) CSI-RS(s). In some example embodiments, the first device 110 may transmit (480) a CSI report based on the CSI measurement via the first cell 101 to the second device 120.

Thus, the TCI activation for the second cell 102 may be performed based on the beam information, and the second cell 102 activation may complete.

Figure 5:
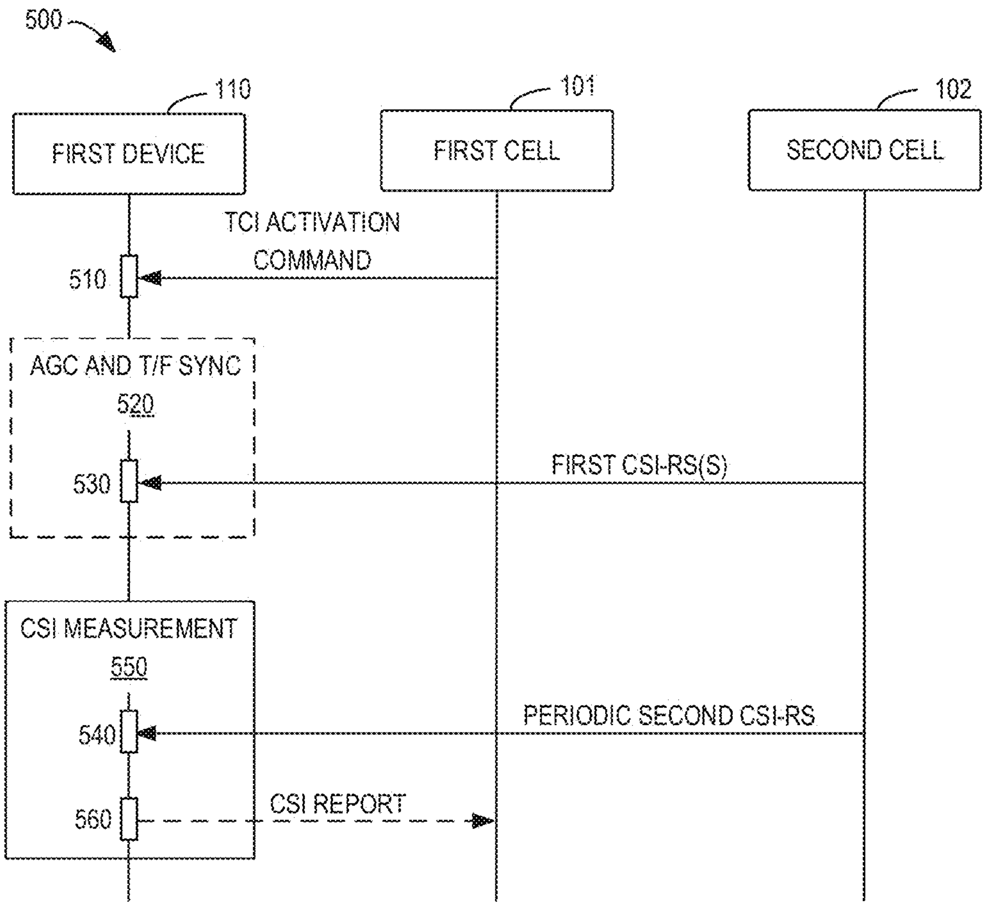
FIG. 5 illustrates another signaling diagram for beam information-based TCI activation according to some example embodiments of the present disclosure.

FIG. 5 illustrates another signaling diagram 500 for beam information-based TCI activation between the first device 110 and the first and second cells 101 and 102 according to some example embodiments of the present disclosure. For the purpose of discussion, the signaling diagram 500 will be described from the perspective of the first device 110 with reference to FIG. 1.

To further reduce the cell activation delay, some example embodiments according to the present disclosure proposes that the TCI activation command carries an identification (ID) of CSI-RS(s) associated with the TCI activation command. The first device 110 performs the CSI measurement by using associated CSI-RS(s). For example, the first device 110 may perform AGC and T/F synchronization by using a first CRI-RS associated with the TCI activation command instead of the SSB. In addition, the first device 110 performs the CSI measurement by using a second CSI-RS associated with the first CSI-RS. In this way, the SP/P CSIRS activation command or periodic CSI-RS configuration can be skipped. Thus, the CSI measurement for the second cell and the cell activation for the second cell may be facilitated and be faster.

As shown in FIG. 5, the first device 110 receives (510) a TCI activation command for the second cell 102 via the first cell 101 from the second device 120. For example, the TCI activation command may be transmitted via the first cell 101 based on the beam information received from the first device 110. The TCI activation command comprises an identification (ID) of a first CSI-RS.

In some example embodiments, the first device 110 may perform (520) an AGC and T/F synchronization. In some example embodiments, the first device receives (520) the first CSI-RS via the second cell 102 from a network node of the second cell 102. For example, the network node of the second cell 102 may comprise the second device 120 or a further network device. For example, one or more first CSI-RS(s) may be received (520) by the first device 110. The first device 110 may perform (520) the AGC and T/F synchronization based on the first CSI-RS(s).

In some example embodiments, the first CSI-RS may comprise an aperiodic CSI-RS for tracking (A-TRS), or an aperiodic CSI-RS (A-CSIRS). In such cases, the first CSI-RS may be received after the TCI activation command. For example, the timing for the first CSI-RS need to follow the TCI activation command. The first A-TRS/CSI-RS may be transmitted on the second cell 102 within a certain time period after TCI activation. For example, the A-CSIRS/A-TRS may be transmitted X slots after the TCI activation command. X may be a predefined integer.

Alternatively, or in addition, in some example embodiments, the first CSI-RS may comprise a CSI-RS for tracking (TRS) or a CSI-RS. In such cases, the first CSI-RS may be received repeatedly via the second cell 102 until the first device 110 transmits a CSI report associated with the second cell 102 to the second device 120 via the first cell 101. That is, if there is uncertainty on the timing of TRS/CSI-RS on the second cell 102, the network can repeat the TRS/CSI-RS until the first device 110 transmits the valid CSI report. For example, if the first cell 101 and second cell 102 are non-collocated, by transmitting TRS or CSIRS repeatedly, it can make sure the first CSI-RS can be received by the first device 110.

The first device 110 receives (540) periodic second CSI-RS(s) associated with the first CSI-RS via the second cell 102. In some example embodiments, the first device 110 performs (550) a channel measurement such as a CSI measurement for the second cell 102 based on the received (540) CSI-RS(s). For example, the first device 110 may measure the periodic CSI-RS associated with the aperiodic TRS/CSI-RS for CSI measurement. In this way, the CSI can be measured without the SP-CSI-RS activation or P-CSI-RS configuration. Thus, it can save the time for SP-CSI-RS activation or P-CSI-RS configuration.

In some example embodiments, the first device 110 may transmit (540) a CSI report based on the CSI measurement via the first cell 101 to the second device 120. Thus, the TCI activation for the second cell 102 may complete, and the second cell 102 activation may complete.

By using the TCI activation command to carry the identification (ID) of a first CSI-RS, the first cell 101 may not need to transmit the SP/P CSIRS activation command. In addition, the first device 110 may perform the CSI measurement based on CSI-RS instead of SSB. In this way, SP-CSI-RS activation or periodic CSI-RS configuration can be skipped to save the MAC uncertainty time. Thus, the AGC and T/F synchronization may be facilitated and be faster.

Figure 6:
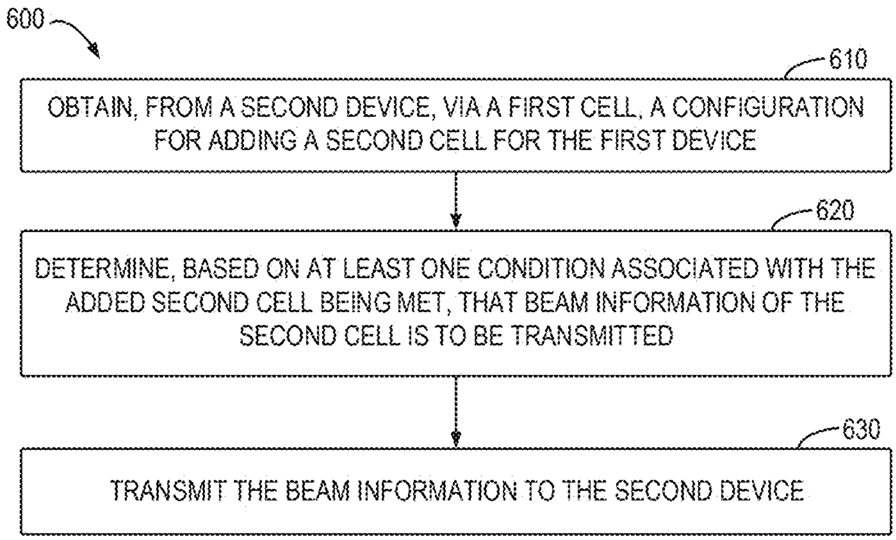
FIG. 6 illustrates a flowchart of a method implemented at a first device according to some example embodiments of the present disclosure.

FIG. 6 shows a flowchart of an example method 600 implemented at a first device in accordance with some example embodiments of the present disclosure. For the purpose of discussion, the method 600 will be described from the perspective of the first device 110 in FIG. 1.

At block 610, the first device 110 obtains, from a second device 120, via a first cell 101, a configuration for adding a second cell 102 for the first device.

At block 620, the first device 110 determines, based on at least one condition associated with the added second cell 102 being met, that beam information of the second cell 102 is to be transmitted.

In some example embodiments, at block 620, if a first condition is met, the first device 110 determines that the beam information of the second cell 102 is to be transmitted. The first condition is that the second cell 102 has been activated and then deactivated.

In some example embodiments, at block 620, if a second condition is met, the first device 110 determines that the beam information of the second cell 102 is to be transmitted. The second condition is that measurement information of the second cell 102 has been transmitted after the second cell 102 has been added for the first device 110.

In some example embodiments, at block 620, if a third condition is met, the first device 110 determines that the beam information of the second cell 102 is to be transmitted. The third condition is that a time duration between the addition of the second cell 102 for the first device 110 and reception of an activation command for the second cell 102 is longer than a first time period. In some example embodiments, the first time period is equal to or longer than a cell identification time for identifying the second cell 102 by the first device 110.

In some example embodiments, at block 620, if a fourth condition is met, the first device 110 determines that the beam information of the second cell 102 is to be transmitted. The fourth condition is that the first device 110 has been configured with inter-frequency measurement on the second cell 102 before the second cell 102 is added.

At block 630, the first device 110 transmits the beam information to the second device 120.

In some example embodiments, the first device 110 may receive, from the second device 120, an indication of a first resource on the first cell 101 allocated by the second device 120 for a transmission of the beam information. In such cases, at block 630, the first device 110 may transmit the beam information to the second device on the first resource. In some example embodiments, at block 630, the first device 110 transmits a measurement report of the second cell 102 including a beam index of the second cell 102.

In some example embodiments, at block 630, the first device 110 transmits the beam information to the second device 120 on a second resource on the first cell 101 available for a transmission of a channel quality information report or a reference signal receiving power report.

In some example embodiments, at block 630, the first device 110 transmits a predefined value for the channel quality information report or the reference signal receiving power report, the predefined value indicating a beam index of the second cell 102.

In some example embodiments, the beam information is transmitted on the second resource before a transmission configuration indication activation command for the second cell 102 is received.

In some example embodiments, at block 630, the first device 110 transmits the beam information to the second device 120 within a third time period after receiving an activation command for the second cell 102 from the second device 120.

In some example embodiments, the indication of the resource is received within a second time period after receiving an activation command for the second cell 102 from the second device 120 and after an interruption window of the first device 110. The second time period and the third time period may be the same or different.

Figure 7:
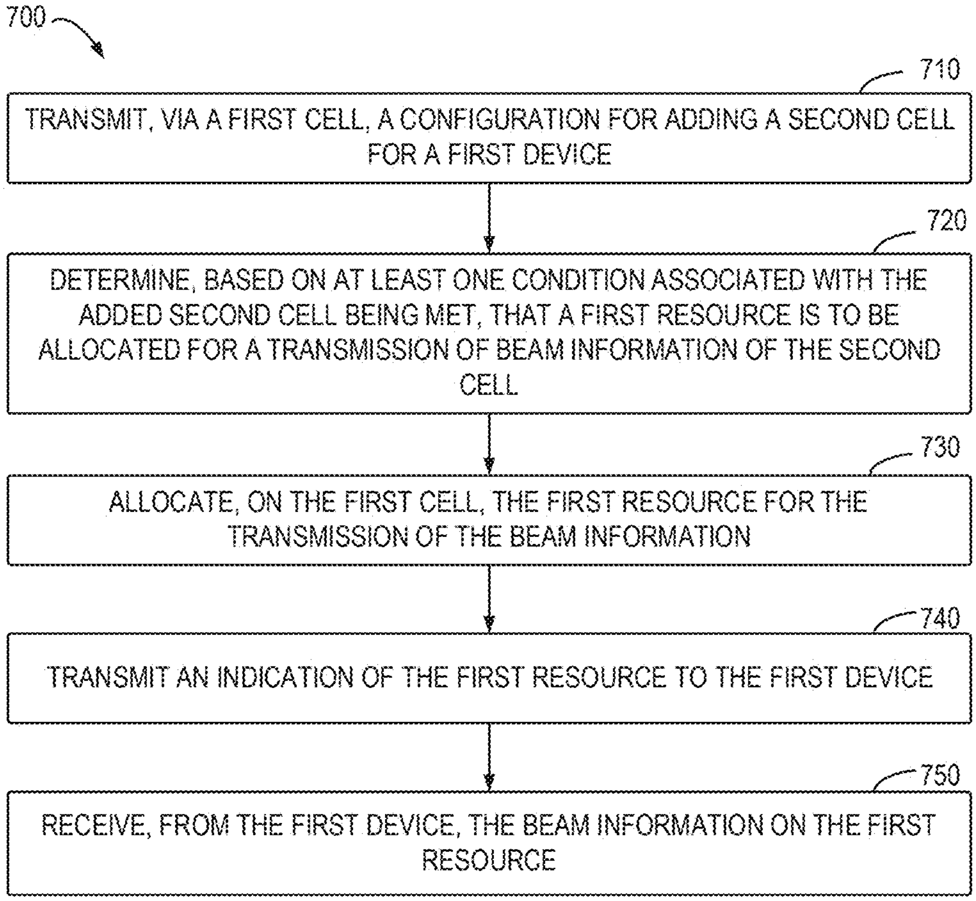
FIG. 7 illustrates a flowchart of a method implemented at a second device according to some example embodiments of the present disclosure.

FIG. 7 shows a flowchart of an example method 700 implemented at a second device in accordance with some example embodiments of the present disclosure. For the purpose of discussion, the method 700 will be described from the perspective of the second device 120 in FIG. 1.

At block 710, the second device 120 transmits, to a first device 110, via a first cell 101, a configuration of adding a second cell 102 for the first device 110.

At block 720, the second device 120 determines, based on at least one condition associated with the added second cell 102 being met, that a first resource is to be allocated for a transmission of beam information of the second cell 102.

In some example embodiments, at block 720, if a first condition is met, the second device 120 determines that the first resource is to be allocated. The first condition is that the second cell 102 has been activated and then deactivated.

In some example embodiments, at block 720, if a second condition is met, the second device 120 determines that the first resource is to be allocated. The second condition is that measurement information of the second cell 102 has been received after the second cell 102 has been added for the first device 110.

In some example embodiments, at block 720, if a third condition is met, the second device 120 determine that the first resource is to be allocated. The third condition is that a time duration between the addition of the second cell 102 for the first device 110 and transmission of an activation command for the second cell 102 is longer than a first time period. In some example embodiments, the first time period is equal to or longer than a cell identification time for identifying the second cell 102 by the first device 110.

In some example embodiments, at block 720, if a fourth condition is met, the second device 120 determines that the first resource is to be allocated. The fourth condition is that the second device 120 has configured the first device 110 with inter-frequency measurement on the second cell 102 before the second cell 102 is added.

At block 730, the second device 120 allocates, on the first cell 101, the first resource for the transmission of the beam information.

At block 740, the second device 120 transmits, to the first device 110, an indication of the first resource. In some example embodiments, at block 740, the second device 120 transmits the indication of the resource within a second time period after transmitting an activation command for the second cell 102 and after an interruption window of the first device 110.

In some example embodiments, at block 740, the second device 120 transmits a measurement report of the second cell 102 including a beam index of the second cell 102.

At block 750, the second device 120 receives, from the first device 110, the beam information on the first resource.

In some example embodiments, based on receiving the beam information, the second device 120 may transmit, from the first cell 101 to the second cell 102, the beam information or a transmission configuration indication activation command for the second cell 102.

In some example embodiments, based on receiving the beam information, the second device 120 may transmit, to the first device 110, via the first cell 101, a transmission configuration indication activation command for the second cell 102. The transmission configuration indication activation command indicates an identification of a first channel-state information reference signal associated with the transmission configuration indication activation command. In some example embodiments, the first channel-state information reference signal comprises an aperiodic channel-state information reference signal.

Figure 8:
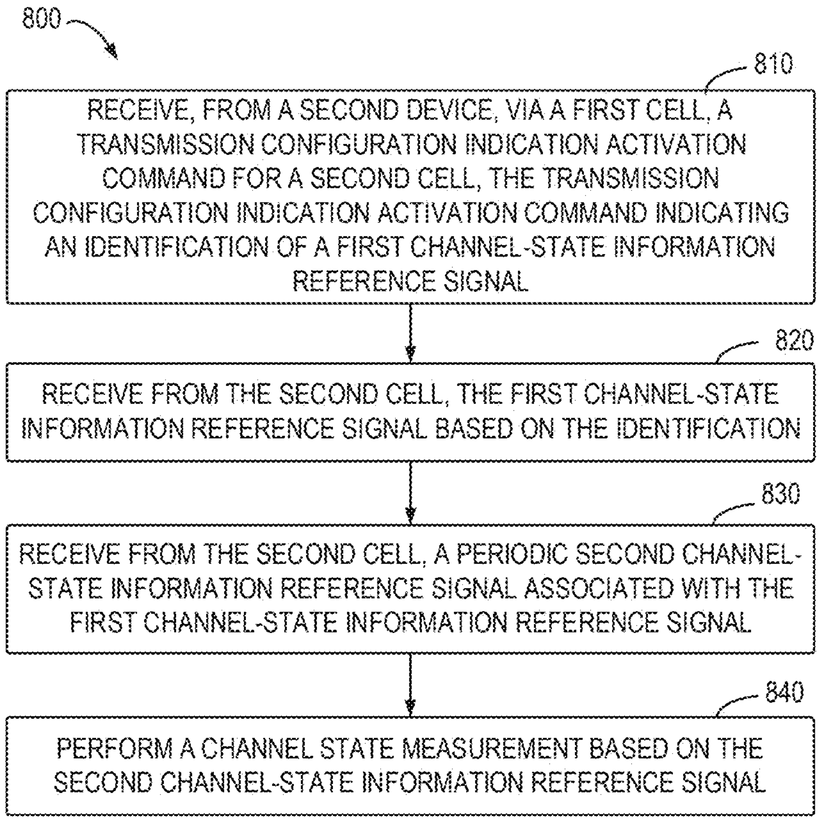
FIG. 8 illustrates a flowchart of a method implemented at a first device according to some example embodiments of the present disclosure.

FIG. 8 shows a flowchart of an example method 800 implemented at a first device in accordance with some example embodiments of the present disclosure. For the purpose of discussion, the method 800 will be described from the perspective of the first device 110 in FIG. 1.

At block 810, the first device 110 receives, from a second device 120, via a first cell 101, a transmission configuration indication activation command for a second cell 102. The transmission configuration indication activation command indicates an identification of a first channel-state information reference signal.

At block 820, the first device 110 receives, from the second cell 102, the first channel-state information reference signal based on the identification.

In some example embodiments, the first channel-state information reference signal comprises one of the following: an aperiodic channel-state information reference signal for tracking, or an aperiodic channel-state information reference signal.

Alternatively, or in addition, in some example embodiments, the first channel-state information reference signal comprises one of the following: a channel-state information reference signal for tracking, or a channel-state information reference signal. The first channel-state information reference signal may be transmitted repeatedly by the second cell 102 until the first device 110 transmits a channel state information report associated with the second cell 102 to the second device 120 via the first cell 101.

At block 830, the first device 110 receives, from the second cell 102, a periodic second channel-state information reference signal associated with the first channel-state information reference signal.

At block 840, the first device 110 performs a channel state measurement based on the second channel-state information reference signal.

In some example embodiments, the first device 110 may perform an automatic gain control and time and frequency synchronization based on the first channel-state information reference signal. In some example embodiments, the first cell 101 and second cell 102 are non-collocated.

In some example embodiments, an apparatus capable of performing any of the method 600 (for example, the first device 110 in FIG. 1) may comprise means for performing the respective operations of the method 600. The means may be implemented in any suitable form. For example, the means may be implemented in a circuitry or software module. The apparatus may be implemented as or included in the first device 110 in FIG. 1.

In some example embodiments, the apparatus comprises means for obtaining, from a second device, via a first cell, a configuration for adding a second cell for the apparatus; means for determining, based on at least one condition associated with the added second cell being met, that beam information of the second cell is to be transmitted; and means for transmitting the beam information to the second device.

In some example embodiments, means for determining that the beam information of the second cell is to be transmitted comprises: means for in accordance with a determination that a first condition is met, determining that the beam information of the second cell is to be transmitted, the first condition being that the second cell has been activated and then deactivated.

In some example embodiments, means for determining that the beam information of the second cell is to be transmitted comprises: means for in accordance with a determination that a second condition is met, determining that the beam information of the second cell is to be transmitted, the second condition being that measurement information of the second cell has been transmitted after the second cell has been added for the apparatus.

In some example embodiments, means for determining that the beam information of the second cell is to be transmitted comprises: means for in accordance with a determination that a third condition is met, determining that the beam information of the second cell is to be transmitted, the third condition being that a time duration between the addition of the second cell for the apparatus and reception of an activation command for the second cell is longer than a first time period.

In some example embodiments, means for determining that the beam information of the second cell is to be transmitted comprises: means for in accordance with a determination that a fourth condition is met, determining that the beam information of the second cell is to be transmitted, the fourth condition being that the apparatus has been configured with inter-frequency measurement on the second cell before the second cell is added.

In some example embodiments, the first time period is equal to or longer than a cell identification time for identifying the second cell by the first device.

In some example embodiments, the apparatus further comprises: means for receiving, from the second device, an indication of a first resource on the first cell allocated by the second device for a transmission of the beam information. Means for transmitting the beam information comprises: means for transmitting the beam information to the second device on the first resource.

In some example embodiments, the indication of the resource is received within a second time period after receiving an activation command for the second cell and after an interruption window of the first device.

In some example embodiments, means for transmitting the beam information comprises: means for transmitting a measurement report of the second cell including a beam index of the second cell.

In some example embodiments, means for transmitting the beam information comprises: means for transmitting the beam information to the second device on a second resource on the first cell available for a transmission of a channel quality information report or a reference signal receiving power report.

In some example embodiments, means for transmitting the beam information comprises: means for transmitting a predefined value for the channel quality information report or the reference signal receiving power report, the predefined value indicating a beam index of the second cell.

In some example embodiments, the beam information is transmitted on the second resource before a transmission configuration indication activation command for the second cell is received.

In some example embodiments, means for transmitting the beam information comprises: means for transmitting the beam information to the second device within a third time period after receiving an activation command for the second cell from the second device.

In some example embodiments, the apparatus further comprises means for performing other operations in some example embodiments of the method 600 or the first device 110. In some example embodiments, the means comprises at least one processor; and at least one memory storing instructions that, when executed by the at least one processor, cause the performance of the apparatus.

In some example embodiments, an apparatus capable of performing any of the method 700 (for example, the second device 120 in FIG. 1) may comprise means for performing the respective operations of the method 700. The means may be implemented in any suitable form. For example, the means may be implemented in a circuitry or software module. The apparatus may be implemented as or included in the second device 120 in FIG. 1.

In some example embodiments, the apparatus comprises means for transmitting, to a first device, via a first cell, a configuration of adding a second cell for the first device; means for determining, based on at least one condition associated with the added second cell being met, that a first resource is to be allocated for a transmission of beam information of the second cell; means for allocating, on the first cell, the first resource for the transmission of the beam information; means for transmitting, to the first device, an indication of the first resource; and means for receiving, from the first device, the beam information on the first resource.

In some example embodiments, means for determining that the first resource is to be allocated comprises: means for in accordance with a determination that a first condition is met, determining that the first resource is to be allocated, the first condition being that the second cell has been activated and then deactivated.

In some example embodiments, means for determining that the first resource is to be allocated comprises: means for in accordance with a determination that a second condition is met, determining that the first resource is to be allocated, the second condition being that measurement information of the second cell has been received after the second cell has been added for the first device.

In some example embodiments, means for determining that the first resource is to be allocated comprises: means for in accordance with a determination that a third condition is met, determining that the first resource is to be allocated, the third condition being that a time duration between the addition of the second cell for the first device and transmission of an activation command for the second cell is longer than a first time period.

In some example embodiments, means for determining that the first resource is to be allocated comprises: means for in accordance with a determination that a fourth condition is met, determining that the first resource is to be allocated, the fourth condition being that the apparatus has configured the first device with inter-frequency measurement on the second cell before the second cell is added.

In some example embodiments, the first time period is equal to or longer than a cell identification time for identifying the second cell by the first device.

In some example embodiments, means for transmitting the indication of the resource comprises: means for transmitting the indication of the resource within a second time period after transmitting an activation command for the second cell and after an interruption window of the first device.

In some example embodiments, means for transmitting the beam information comprises: means for transmitting a measurement report of the second cell including a beam index of the second cell.

In some example embodiments, the apparatus further comprises: means for based on receiving the beam information, transmitting, from the first cell to the second cell, the beam information or a transmission configuration indication activation command for the second cell.

In some example embodiments, the apparatus further comprises: means for based on receiving the beam information, transmitting, to the first device, via the first cell, a transmission configuration indication activation command for the second cell. The transmission configuration indication activation command indicates an identification of a first channel-state information reference signal associated with the transmission configuration indication activation command.

In some example embodiments, the first channel-state information reference signal comprises an aperiodic channel-state information reference signal.

In some example embodiments, the apparatus further comprises means for performing other operations in some example embodiments of the method 700 or the second device 120. In some example embodiments, the means comprises at least one processor; and at least one memory storing instructions that, when executed by the at least one processor, cause the performance of the apparatus.

In some example embodiments, an apparatus capable of performing any of the method 800 (for example, the first device 110 in FIG. 1) may comprise means for performing the respective operations of the method 800. The means may be implemented in any suitable form. For example, the means may be implemented in a circuitry or software module. The apparatus may be implemented as or included in the first device 110 in FIG. 1.

In some example embodiments, the apparatus comprises means for receiving, from a second device, via a first cell, a transmission configuration indication activation command for a second cell, the transmission configuration indication activation command indicating an identification of a first channel-state information reference signal; means for receiving, from the second cell, the first channel-state information reference signal based on the identification; means for receiving, from the second cell, a periodic second channel-state information reference signal associated with the first channel-state information reference signal; and means for performing a channel state measurement based on the second channel-state information reference signal.

In some example embodiments, the apparatus further comprises: means for performing an automatic gain control and time and frequency synchronization based on the first channel-state information reference signal.

In some example embodiments, the first channel-state information reference signal comprises one of the following: an aperiodic channel-state information reference signal for tracking, or an aperiodic channel-state information reference signal.

In some example embodiments, the first channel-state information reference signal comprises one of the following: a channel-state information reference signal for tracking, or a channel-state information reference signal. The first channel-state information reference signal may be transmitted repeatedly by the second cell until the apparatus transmits a channel state information report associated with the second cell to the second device via the first cell. In some example embodiments, the first and second cells are non-collocated.

In some example embodiments, the apparatus further comprises means for performing other operations in some example embodiments of the method 800 or the first device 110. In some example embodiments, the means comprises at least one processor; and at least one memory storing instructions that, when executed by the at least one processor, cause the performance of the apparatus.

Figure 9:
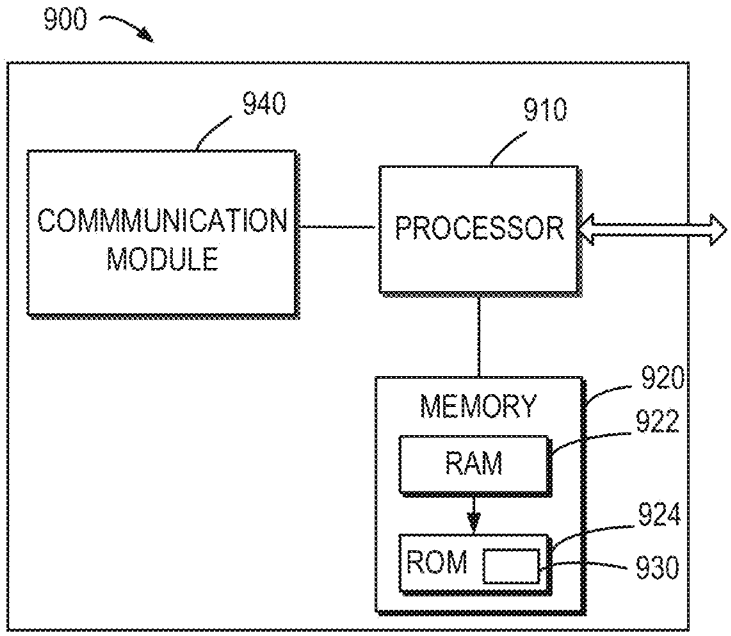
FIG. 9 illustrates a simplified block diagram of a device that is suitable for implementing example embodiments of the present disclosure.

FIG. 9 is a simplified block diagram of a device 900 that is suitable for implementing example embodiments of the present disclosure. The device 900 may be provided to implement a communication device, for example, the first device 110 or the second device 120 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has one or more communication interfaces to facilitate communication with one or more other modules or devices. The communication interfaces may represent any interface that is necessary for communication with other network elements. In some example embodiments, the communication module 940 may include at least one antenna.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The instructions of the program 930 may include instructions for performing operations/acts of some example embodiments of the present disclosure. The program 930 may be stored in the memory, e.g., the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIG. 2 to FIG. 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 10:
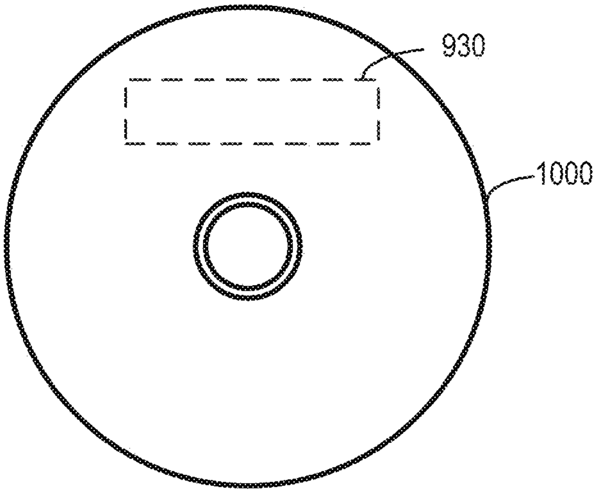
FIG. 10 illustrates a block diagram of an example computer readable medium in accordance with some example embodiments of the present disclosure.

FIG. 10 shows an example of the computer readable medium 1000 which may be in form of CD, DVD or other optical storage disk. The computer readable medium 1000 has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory storing instructions that, when executed by the at least one processor, cause the first device at least to perform:

obtaining, from a second device, via a first cell, a configuration to add a second cell for the first device;

determining, based on at least one condition associated with the added second cell being met, that beam information of the second cell is to be transmitted, wherein the at least one condition comprises a condition that a time duration between the addition of the second cell for the first device and reception of an activation command for the second cell is longer than a first time period, and wherein the first time period is equal to or longer than a cell identification time for identifying the second cell by the first device; and transmitting the beam information to the second device.

2. The first device of claim 1, wherein determining that the beam information of the second cell is to be transmitted comprises:

in accordance with a determination that a first condition is met, determining that the beam information of the second cell is to be transmitted, the first condition being that the second cell has been activated and then deactivated.

3. The first device of claim 1, wherein determining that the beam information of the second cell is to be transmitted comprises:

in accordance with a determination that a second condition is met, determining that the beam information of the second cell is to be transmitted, the second condition being that measurement information of the second cell has been transmitted after the second cell has been added for the first device.

4. The first device of claim 1, wherein determining that the beam information of the second cell is to be transmitted comprises determining that the first device has been configured with inter-frequency measurement on the second cell before the second cell is added.

5. The first device of claim 1, wherein the instructions are further configured to cause the first device to perform:

receiving, from the second device, an indication of a first resource on the first cell allocated by the second device for a transmission of the beam information; and wherein transmitting the beam information comprises:

transmitting the beam information to the second device on the first resource.

6. The first device of claim 5, wherein the indication of the first resource is received within a second time period after receiving an activation command for the second cell from the second device and after an interruption window of the first device.

7. The first device of claim 5, wherein transmitting the beam information comprises:

transmitting a measurement report of the second cell, the measurement report including a beam index of the second cell.

8. The first device of claim 1, wherein transmitting the beam information comprises:

transmitting the beam information to the second device on a second resource on the first cell before a transmission configuration indication activation command for the second cell is received, the second resource being for a transmission of a channel quality information report or a reference signal receiving power report.

9. The first device of claim 8, wherein transmitting the beam information comprises:

transmitting a predefined value in the beam information on the second resource, the predefined value indicating a beam index of the second cell.

10. The first device of claim 1, wherein transmitting the beam information comprises:

transmitting the beam information to the second device within a third time period after receiving an activation command for the second cell from the second device.

11. A second device, comprising:

at least one processor; and at least one memory storing instructions that, when executed by the at least one processor, cause the second device at least to perform:

transmitting, to a first device, via a first cell, a configuration of adding a second cell for the first device;

determining, based on at least one condition associated with the added second cell being met, that a first resource is to be allocated for a transmission of beam information of the second cell, wherein the at least one condition comprises a condition that a time duration between the addition of the second cell for the first device and transmission of an activation command for the second cell is longer than a first time period, and wherein the first time period is equal to or longer than a cell identification time for identifying the second cell by the first device;

allocating, in the first cell, the first resource for the transmission of the beam information;

transmitting, to the first device, an indication of the first resource; and receiving, from the first device, the beam information on the first resource.

12. The second device of claim 11, wherein determining that the first resource is to be allocated comprises:

in accordance with a determination that a first condition is met, determining that the first resource is to be allocated, the first condition being that the second cell has been activated and then deactivated.

13. The second device of claim 11, wherein determining that the first resource is to be allocated comprises:

in accordance with a determination that a second condition is met, determining that the first resource is to be allocated, the second condition being that measurement information of the second cell has been received after the second cell has been added for the first device.

14. The second device of claim 11, wherein determining that the first resource is to be allocated comprises determining that the second device has configured the first device with inter-frequency measurement on the second cell before the second cell is added.

15. The second device of claim 11, wherein transmitting the indication of the first resource comprises:

transmitting the indication of the first resource within a second time period after transmitting the activation command for the second cell and after an interruption window of the first device.

16. The second device of claim 11, wherein receiving the beam information comprises:

receiving a measurement report of the second cell, the measurement report including a beam index of the second cell.

17. The second device of claim 11, wherein the instructions are further configured to cause the second device to perform:

based on receiving the beam information, transmitting, from the first cell to the second cell, at least one of the beam information or a transmission configuration indication activation command for the second cell; and based on receiving the beam information, transmitting, to the first device, via the first cell, the transmission configuration indication activation command for the second cell, the transmission configuration indication activation command indicating an identification of a first channel-state information reference signal associated with the transmission configuration indication activation command.

* * * * *